US012686799B2

(12) United States Patent     (10) Patent No.:   US 12,686,799 B2

Matsumoto et al.     (45) Date of Patent:    Jul. 21, 2026

(54) WATER-DISPERSED PRESSURE-SENSITIVE ADHESIVE COMPOSITION

(71) Applicant: NITTO DENKO CORPORATION, Ibaraki (JP)

(72) Inventors: Hayata Matsumoto, Osaka (JP); Keisuke Shimokita, Osaka (JP); Shuhei Yamamoto, Osaka (JP); Amane Sawamura, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 829 days.

(21) Appl. No.: 17/865,844

(22) Filed: Jul. 15, 2022

(65) Prior Publication Data

US 2023/0047269 A1     Feb. 16, 2023

(30) Foreign Application Priority Data

Aug. 6, 2021   (JP) ................................. 2021-130285

(51) Int. Cl.
    *C09J 133/08*       (2006.01)
    *C09J 133/06*       (2006.01)

(52) U.S. Cl.
    CPC ......... *C09J 133/08* (2013.01); *C09J 133/064* (2013.01); *C09J 2301/312* (2020.08)

(58) Field of Classification Search
    CPC ............. C09J 133/00; C09J 7/38; C09J 7/385
    See application file for complete search history.

(56) References Cited

U.S. PATENT DOCUMENTS

| | | | |
|---|---|---|---|
| 3,383,317 A * | 5/1968 | Jacoby ..................... | C09K 5/20 |
| | | | 252/194 |
| 7,073,201 B2 | 7/2006 | Sunada et al. | |
| 9,102,852 B2 | 8/2015 | Shimokawa et al. | |
| 2003/0212195 A1 | 11/2003 | Matsumoto et al. | |
| 2009/0088516 A1* | 4/2009 | Li ........................... | C09D 7/44 |
| | | | 524/502 |
| 2013/0095298 A1 | 4/2013 | Shimokawa et al. | |
| 2018/0134888 A1* | 5/2018 | Ternorutsky ............ | C08L 33/08 |

FOREIGN PATENT DOCUMENTS

| | | |
|---|---|---|
| EP | 2 492 330 A2 | 8/2012 |
| EP | 3 878 877 A1 | 9/2021 |
| JP | 2003-027027 A | 1/2003 |
| JP | 2003-277708 A | 10/2003 |
| JP | 2004-043784 A | 2/2004 |
| JP | 2004-269699 A | 9/2004 |
| JP | 2006-016512 A | 1/2006 |
| JP | 2007-056248 A | 3/2007 |
| JP | 2007-70448 A | 3/2007 |
| JP | 2008-133433 A | 6/2008 |
| JP | 2009-73920 A | 4/2009 |
| JP | 2011-80074 A | 4/2011 |
| JP | 2018-104485 A | 7/2018 |
| JP | 2021-134274 A | 9/2021 |
| WO | WO-2013146939 A1 * | 10/2013 ............. C09J 7/385 |
| WO | 2016/171093 A1 | 10/2016 |

OTHER PUBLICATIONS

Machine translation of WO 2013/146939 (2013, 25 pages).*
Non-Final Office Action issued Mar. 13, 2025 in United States U.S. Appl. No. 17/865,857.
Extended European Search Report issued Dec. 23, 2022 in European Application No. 22186987.8.
Extended European Search Report dated Dec. 23, 2022 in Application No. 22188760.7.
Communication dated May 9, 2025 in European Application No. 22 188 760.7.
Communication issued May 9, 2025 in European Application No. 22188760.7.
Notice of Allowance dated Jul. 8, 2025 in United States U.S. Appl. No. 17/865,857.
Notice of Reasons for Refusal dated Oct. 28, 2025 in Japanese Application No. 2022-068622.
Yoshiyuki Ishibashi, "Latex Technical Course (4) synthetic latex Types and Basic Properties SBR, IR", Journal of the Japanese Rubber Society, 1973, vol. 46, No. 3, pp. 205-215 (12 pages).
Hiroshi Iesako, "High-solid acrylic emulsion adhesive—High solid acrylic emulsion PSAs-", Toagosei Kenkyu Nenpo, 1999, No. 2, pp. 33-38 (9 pages).
Notice of Reasons for Refusal dated Mar. 10, 2026, issued in Japanese application No. 2022-122793.
Decision on Refusal issued May 19, 2026 in JP Appln. No. 2022-122793.

* cited by examiner

*Primary Examiner* — Brieann R Johnston

(74) *Attorney, Agent, or Firm* — Sughrue Mion, PLLC

(57)          ABSTRACT

A water-dispersed pressure-sensitive adhesive composition includes a water-dispersible polymer and water. The viscosity X (Pa·s) and the dynamic surface tension Y (mN/m) at a life time of 100 milliseconds satisfy the following formulas (1) and (2):

$$0.15 \leq X \leq 1.25 \tag{1}$$

$$Y \leq 19.3X + 35 \tag{2}$$

12 Claims, 6 Drawing Sheets

WATER-DISPERSED PRESSURE-SENSITIVE ADHESIVE COMPOSITION

CROSS-REFERENCE TO RELATED APPLICATION

The present application claims priority from Japanese Patent Application No. 2021-130285 filed on Aug. 6, 2021, the contents of which are hereby incorporated by reference into this application.

TECHNICAL FIELD

The present invention relates to a water-dispersed pressure-sensitive adhesive composition.

BACKGROUND ART

In recent years, a single-sided pressure-sensitive adhesive sheet and a double-sided pressure-sensitive adhesive sheet have been used in various technical fields.

As the double-sided pressure-sensitive adhesive sheet, for example, a double-sided pressure-sensitive adhesive tape including a polyester film (release film), a pressure-sensitive adhesive layer, a support, a pressure-sensitive adhesive layer, and a polyester film (release film) in order has been proposed (ref: for example, Patent Document 1). Further, such a pressure-sensitive adhesive layer is obtained by coating an acrylic pressure-sensitive adhesive obtained by dissolving an acrylic copolymer in ethyl acetate (organic solvent) on a polyester film and forming a coating film.

CITATION LIST

Patent Document

Patent Document 1: Japanese Unexamined Patent Publication No. 2018-104485

SUMMARY OF THE INVENTION

Problem to be Solved by the Invention

On the other hand, in Patent Document 1, an organic solvent is used in preparation of a pressure-sensitive adhesive composition (acrylic pressure-sensitive adhesive). When the organic solvent is used, there is a problem that since the organic solvent volatilizes on coating of the pressure-sensitive adhesive composition, an environmental load becomes high.

On the other hand, it has been considered that a water-dispersed pressure-sensitive adhesive composition (emulsion) containing no organic solvent is used instead of the pressure-sensitive adhesive composition containing an organic solvent.

However, when the pressure-sensitive adhesive layer is formed by coating such a water-dispersed pressure-sensitive adhesive composition on a substrate (paper or polyester film) subjected to silicone release treatment, there is a problem that the water-dispersed pressure-sensitive adhesive composition is not easily wetted with respect to a silicone release treatment surface (in other words, the water-dispersed pressure-sensitive adhesive composition is easily repelled on the silicone release treatment surface), so that the pressure-sensitive adhesive layer cannot be uniformly formed on the substrate subjected to the silicone release treatment. In particular, as the pressure-sensitive adhesive layer becomes thinner, the above-described problem tends to be remarkable. In addition, when the substrate subjected to the silicone release treatment is a polyester film, since it is transparent, there is also a problem that appearance defects due to streaks and repellence become conspicuous, and high quality cannot be achieved.

On the other hand, in order to make the water-dispersed pressure-sensitive adhesive composition easily wettable with respect to the substrate subjected to the silicone release treatment, it is also considered that the viscosity of the water-dispersed pressure-sensitive adhesive composition increases. However, when the viscosity of the water-dispersed pressure-sensitive adhesive composition increases, the streaks occur in the pressure-sensitive adhesive layer when the water-dispersed pressure-sensitive adhesive composition is coated on the substrate subjected to the silicone release treatment.

The present invention provides a water-dispersed pressure-sensitive adhesive composition which is capable of reducing an environmental load and suppressing the occurrence of repellence and streaks in coating onto a substrate subjected to silicone release treatment.

Means for Solving the Problem

The present invention [1] includes a water-dispersed pressure-sensitive adhesive composition including a water-dispersible polymer and water, wherein the viscosity X (Pa·s) and the dynamic surface tension Y (mN/m) at a life time of 100 milliseconds satisfy the following formulas (1) and (2):

$$0.15 \leq X \leq 1.25 \tag{1}$$

$$Y \leq 19.3X + 35 \tag{2}$$

The present invention [2] includes the water-dispersed pressure-sensitive adhesive composition described in the above-described [1] further satisfying the following formula (3):

$$Y \leq -5.28X^2 + 17.3X + 36 \tag{3}$$

The present invention [3] includes the water-dispersed pressure-sensitive adhesive composition described in the above-described [2] further satisfying the following formula (4):

$$Y \geq 20 \tag{4}$$

The present invention [4] includes the water-dispersed pressure-sensitive adhesive composition described in the above-described [3] further satisfying the following formula (5):

$$X \leq 1.0 \tag{5}$$

The present invention [5] includes the water-dispersed pressure-sensitive adhesive composition described in the above-described [4] further satisfying the following formula (6):

$$0.4 \leq X \tag{6}$$

The present invention [6] includes the water-dispersed pressure-sensitive adhesive composition described in any one of the above-described [1] to [5], wherein the water-dispersible polymer is a water-dispersible acrylic polymer, and the water-dispersible acrylic polymer is a polymer of a monomer component containing 70% by mass or more and 99.5% by mass or less of alkyl (meth)acrylate, 0.1% by mass or more and 10% by mass or less of a carboxy group-containing monomer, and 0% by mass or more and 29.9% by mass or less of a functional group-containing vinyl monomer.

The present invention [7] includes the water-dispersed pressure-sensitive adhesive composition described in the above-described [6], wherein the carboxy group-containing monomer is acrylic acid and/or methacrylic acid.

The present invention [8] includes the water-dispersed pressure-sensitive adhesive composition described in any one of the above-described [1] to [7] further including a leveling agent.

The present invention [9] includes the water-dispersed pressure-sensitive adhesive composition described in the above-described [8], wherein the leveling agent includes sodium dialkylsulfosuccinate.

The present invention [10] includes the water-dispersed pressure-sensitive adhesive composition described in the above-described [9], wherein the sodium dialkylsulfosuccinate has 6 or more and 12 or less carbon atoms.

The present invention [11] includes the water-dispersed pressure-sensitive adhesive composition described in any one of the above-described [8] to [10], wherein the leveling agent content is 0.5 parts by mass or more and below 5 parts by mass with respect to 100 parts by mass of the water-dispersible polymer.

The present invention [12] includes the water-dispersed pressure-sensitive adhesive composition described in any one of the above-described [8] to [11] further including a thickener.

The present invention [13] includes the water-dispersed pressure-sensitive adhesive composition described in the above-described [12], wherein the thickener includes polyacrylic acid or a carboxylic acid-based copolymer.

The present invention [14] includes the water-dispersed pressure-sensitive adhesive composition described in the above-described [12] or [13], wherein the thickener content is 1 part by mass or more and below 8 parts by mass with respect to 100 parts by mass of the water-dispersible polymer.

Effect of the Invention

The water-dispersed pressure-sensitive adhesive composition of the present invention includes a water-dispersible polymer and water. In other words, the water-dispersed pressure-sensitive adhesive composition does not use an organic solvent and uses water. Therefore, it is possible to reduce an environmental load.

In addition, in the water-dispersed pressure-sensitive adhesive composition, the viscosity X and the dynamic surface tension Y satisfy a predetermined relationship. Therefore, it is possible to suppress the occurrence of repellence and streaks in coating onto a substrate subjected to silicone release treatment.

DESCRIPTION OF EMBODIMENTS

Figure 1:
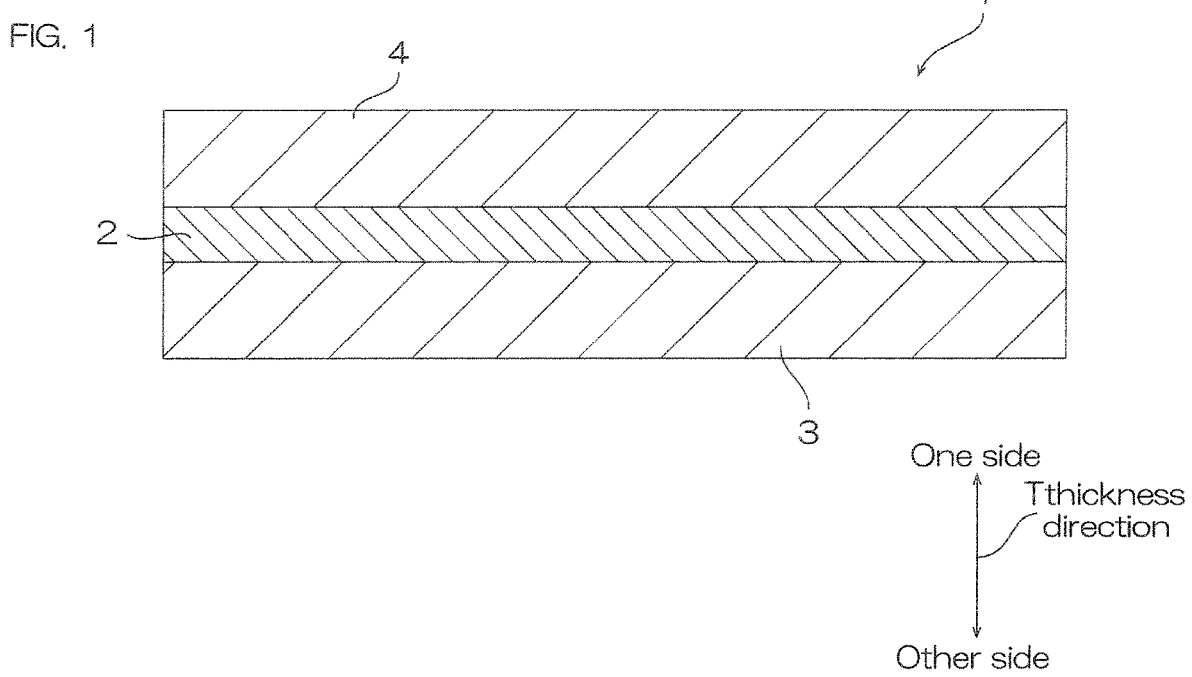
FIG. 1 shows a cross-sectional schematic view in one embodiment of a pressure-sensitive adhesive sheet.

A water-dispersed pressure-sensitive adhesive composition includes a water-dispersible polymer and water. Further, though the details are described later, in the water-dispersed pressure-sensitive adhesive composition, the viscosity X (Pa·s) and the dynamic surface tension Y (mN/m) at a life time of 100 milliseconds satisfy a predetermined relationship.

<Water-Dispersible Polymer>

Examples of the water-dispersible polymer include water-dispersible acrylic polymers, water-dispersible urethane polymers, water-dispersible polyaniline polymers, and water-dispersible polyester polymers, and preferably, water-dispersible acrylic polymers are used.

The water-dispersible acrylic polymer is a polymer of a monomer component.

The monomer component includes alkyl (meth)acrylate as a main component. (Meth)acrylic acid is defined as acrylic acid and/or methacrylic acid.

An example of the alkyl (meth)acrylate includes an alkyl (meth)acrylate having a straight-chain or branched alkyl group having 1 to 20 carbon atoms. Examples of the alkyl (meth)acrylate include methyl (meth)acrylate, ethyl (meth)acrylate, propyl (meth)acrylate, n-butyl (meth)acrylate, isopropyl (meth)acrylate, isobutyl (meth)acrylate, s-butyl (meth)acrylate, t-butyl (meth)acrylate, pentyl (meth)acrylate, isopentyl (meth)acrylate, neopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, isotridodecyl (meth)acrylate, tetradecyl (meth)acrylate, isotetradecyl (meth)acrylate, pentadecyl (meth)acrylate, hexadecyl (meth)acrylate, heptadecyl (meth)acrylate, octadecyl (meth)acrylate, isooctadecyl (meth)acrylate, nonadecyl (meth)acrylate, and eicosyl (meth)acrylate. As the alkyl (meth)acylate, preferably, alkyl acylate having an alkyl group having 1 to 12 carbon atoms is used, more preferably, methyl acrylate and 2-ethylhexyl acrylate are used.

These alkyl (meth)acrylates may be used alone or in combination of two or more, and preferably, methyl acrylate and alkyl acrylate having an alkyl group having 2 to 8 carbon atoms are used in combination, more preferably, methyl acrylate and 2-ethylhexyl acrylate are used in combination.

A ratio of the alkyl (meth)acrylate is, for example, 70% by mass or more, preferably 80% by mass or more, more preferably 90% by mass or more, further more preferably 95% by mass or more, and for example, 99.5% by mass or less, preferably 99% by mass or less with respect to the monomer component.

Further, the monomer component may also include a carboxy group-containing vinyl monomer (carboxy group-containing monomer).

Examples of the carboxy group-containing vinyl monomer include acrylic acid, methacrylic acid, 2-carboxyethyl (meth)acrylate, carboxypentyl (meth)acrylate, itaconic acid, maleic acid, fumaric acid, and crotonic acid. Preferably, acrylic acid and/methacrylic acid are used. When the carboxy group-containing vinyl monomer is acrylic acid and/or methacrylic acid, the tackiness and the mechanical stability of emulsion particles are excellent.

The ratio of the carboxy group-containing vinyl monomer is, for example, 0.1% by mass or more, preferably 1.0% by mass or more, more preferably 1.5% by mass or more with respect to the monomer component. The ratio of the carbpxy group-containing vinyl monomer in the monomer component is, for example, 10% by mass or less, preferably 5% by mass or less, more preferably 3% by mass or less.

These carboxy group-containing vinyl monomers may be used alone or in combination of two or more.

Further, the monomer component may also contain one or two or more kinds of functional group-containing vinyl monomers copolymerizable with the alkyl (meth)acrylate and the carboxy group-containing vinyl monomer. The functional group-containing vinyl monomer serves to modify the acrylic polymer such as ensuring a cohesive force of the acrylic polymer and introducing a cross-linking point into the acrylic polymer.

Examples of the functional group-containing vinyl monomer (excluding the carboxy group-containing vinyl monomer) include acid anhydride vinyl monomers, hydroxyl group-containing vinyl monomers, sulfo group-containing vinyl monomers, phosphoric acid group-containing vinyl monomers, cyano group-containing vinyl monomers, and glycidyl group-containing vinyl monomers.

Examples of the acid anhydride vinyl monomer include maleic anhydride and itaconic anhydride.

Examples of the hydroxyl group-containing vinyl monomer include 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)methyl (meth)acrylate.

Examples of the sulfo group-containing vinyl monomer include styrene sulfonic acid, allyl sulfonic acid, sodium vinyl sulfonate, 2-(meth)acrylamide-2-methylpropane sulfonate, (meth)acrylamide propane sulfonic acid, sulfopropyl (meth)acrylate, and (meth)acryloyloxy naphthalene sulfonic acid.

An example of the phosphate group-containing vinyl monomer includes 2-hydroxyethylacryloyl phosphate.

Examples of the cyano group-containing vinyl monomer include acrylonitrile and methacrylonitrile.

Examples of the glycidyl group-containing monomer include glycidyl (meth)acrylate and 2-ethylglycidyl ether (meth)acrylate.

The ratio of the functional group-containing vinyl monomer is, for example, 0% by mass or more, preferably 1.0% by mass or more, more preferably 5% by mass or more with respect to the monomer component. The ratio of the functional group-containing vinyl monomer in the monomer component is, for example, 29.9% by mass or less, preferably 10% by mass or less.

These functional group-containing vinyl monomers may be used alone or in combination of two or more.

As described above, the monomer component preferably includes 70% by mass or more and 99.5% by mass or less of an alkyl (meth)acrylate, 0.1% by mass or more and 10% by mass or less of a carboxy group-containing vinyl monomer), and 0% by mass or more and 29.9% by mass or less of a functional group-containing vinyl monomer. In other words, the water-dispersible acrylic polymer is a polymer of such a monomer component. The water-dispersible acrylic polymer has excellent tackiness and mechanical stability of the emulsion particles as long as it is the polymer of the monomer component.

Then, the water-dispersible acrylic polymer is obtained, for example, by emulsion polymerization of the above-described monomer component. In the emulsion polymerization, for example, first, a mixture containing a monomer component, an emulsifier, and water is stirred, thereby preparing a monomer emulsion. Next, a polymerization initiator is added to the monomer emulsion, thereby initiating a polymerization reaction. In the polymerization reaction, a chain transfer agent may be used in order to adjust a molecular weight of the acrylic polymer. Further, additives such as coupling agents and preservatives may be also used. As a polymerization method, dropwise polymerization or collective polymerization may be used. The polymerization time is, for example, 0.5 hours or more, and for example, 10 hours or less. A polymerization temperature is, for example, 50° C. or more, and for example, 80° C. or less.

Examples of the emulsifier include anionic emulsifiers, nonionic emulsifiers, and radically polymerizable emulsifiers (reactive emulsifiers).

Examples of the anionic emulsifier include sodium polyoxyethylene lauryl sulfate, sodium lauryl sulfate, ammonium lauryl sulfate, sodium dodecyl benzene sulfonate, sodium polyoxyethylene alkyl ether sulfate, ammonium polyoxyethylene alkyl phenyl ether sulfate, sodium polyoxyethylene alkyl phenyl ether sulfate, and sodium polyoxyethylene alkyl sulfosuccinate.

Examples of the nonionic emulsifier include polyoxyethylene alkyl ether, polyoxyethylene alkyl phenyl ether, polyoxyethylene fatty acid ester, and polyoxyethylene polyoxypropylene block polymer.

An example of the radically polymerizable emulsifier (reactive emulsifier) includes an emulsifier in which a radically polymerizable functional group is introduced into the above-described anionic emulsifier or the above-described nonionic emulsifier. Examples of the radically polymerizable functional group include vinyl groups, propenyl groups, isopropenyl groups, vinyl ether groups, and allyl ether groups. Specifically, an example thereof includes ammonium-$\alpha$-sulfonate-$\omega$-1-(allyloxymethyl)alkyloxypolyoxyethylene. When the reactive emulsifier is used, the acrylic polymer which is the water-dispersible polymer obtained by emulsion polymerization includes a monomer unit derived from the reactive emulsifier.

A mixing ratio of the emulsifier is, for example, 0.2 parts by mass or more, and for example, 10 parts by mass or less with respect to 100 parts by mass of the monomer component.

These emulsifiers may be used alone or in combination of two or more.

Examples of the polymerization initiator include azo polymerization initiators and peroxide polymerization initiators.

Examples of the azo polymerization initiator include 2,2'-azobisisobutyronitrile, 2,2'-azobis(2-amidinopropane) dihydrochloride, 2,2'-azobis[2-(5-methyl-2-imidazoline-2- yl)propane]dihydrochloride, 2,2'-azobis{2-[N-(2-carboxy-ethyl)amidino]propane} n-hydrate, and 2,2'-azobis(N,N'-dimethyleneisobutylamidine).

Examples of the peroxide polymerization initiator include benzoyl peroxide, t-butyl hydroperoxide, and hydrogen peroxide.

As the polymerization initiator, preferably, an azo polymerization initiator is used, more preferably, 2,2'-azobis{2-[N-(2-carboxyethyl)amidino]propane} n-hydrate is used.

The mixing ratio of the polymerization initiator is, for example, 0.01 parts by mass or more, and for example, 2 parts by mass or less with respect to 100 parts by mass of the monomer component.

These polymerization initiators may be used alone or in combination of two or more.

Examples of the chain transfer agent include glycidyl-mercaptan, mercaptoacetic acid, 2-mercaptoethanol, t-lauryl mercaptan, t-dodecanethiol, thioglycolic acid, 2-ethylhexyl thioglycolic acid, and 2,3-dimercapto-1-propanol, and preferably, t-lauryl mercaptan is used.

The mixing ratio of the chain transfer agent is, for example, 0.001 parts by mass or more, and for example, 0.5 parts by mass or less with respect to 100 parts by mass of the monomer component.

These chain transfer agents may be used alone or in combination of two or more.

By such emulsion polymerization, the water-dispersible acrylic polymer is prepared as an aqueous dispersion liquid, to be specific, an aqueous dispersion liquid (emulsion) in which the water-dispersible acrylic polymer is dispersed in water. That is, the aqueous dispersion liquid is also a water-dispersed pressure-sensitive adhesive composition containing a water-dispersible polymer and water.

A weight average molecular weight (Mw) of the water-dispersible acrylic polymer to be obtained is, for example, 100000 or more, preferably 300000 or more, and for example, 5000000 or less, preferably 3000000 or less. The weight average molecular weight of the acrylic polymer is calculated in terms of polystyrene measured by gel permeation chromatography (GPC).

<Leveling Agent>

The water-dispersed pressure-sensitive adhesive composition preferably contains a leveling agent. When the water-dispersed pressure-sensitive adhesive composition contains the leveling agent, the viscosity X (Pa·s) to be described later and the dynamic surface tension Y (mN/m) at a life time of 100 milliseconds to be described later can be adjusted so as to satisfy a predetermined relationship.

Examples of the leveling agent include "SURFINOL 420" (acetylene glycol ethylene oxide surfactant, manufactured by Nissin Chemical co., ltd.), "PELEX OT-P" (sodium dialkylsulfosuccinate, manufactured by Kao Corporation), "NEOCOL P" (sodium dialkylsulfosuccinate, manufactured by DKS Co., Ltd.), "NOPCO WET 50" (sulfonic acid-based anionic surfactant, manufactured by SAN NOPCO LIMITED), "SN WET 126" (modified silicone/special polyether-based surfactant, manufactured by SAN NOPCO LIMITED), "SN WET FST2" (nonionic wetting agent of polyoxyalkyleneamine, manufactured by SAN NOPCO LIMITED), "SN WET S" (nonionic wetting agent of polyoxyalkyleneamine ether, manufactured by SAN NOPCO LIMITED), and "SN WET 125" (modified silicone-based surfactant, manufactured by SAN NOPCO LIMITED).

As the leveling agent, preferably, sodium dialkylsulfosuccinate is used. When the leveling agent contains the sodium dialkylsulfosuccinate, the viscosity X (described later) and the dynamic surface tension Y (described later) can be adjusted so as to satisfy a predetermined relationship (described later).

In addition, the number of carbon atoms of the sodium dialkylsulfosuccinate is, for example, 4 or more, preferably, from the viewpoint of satisfying the viscosity X (described later) and the dynamic surface tension Y (described later) in a predetermined relationship (described later), 6 or more, more preferably 8 or more, and for example, 20 or less, preferably, from the viewpoint of satisfying the viscosity X (described later) and the dynamic surface tension Y (described later) in a predetermined relationship (described later), 12 or less, more preferably 10 or less.

The leveling agent content is, for example, 0.5 parts by mass or more, preferably 1 part by mass or more, and for example, below 5 parts by mass, preferably 3 parts by mass or less, more preferably 2 parts by mass or less with respect to 100 parts by mass of the water-dispersible polymer from the viewpoint of satisfying the viscosity X (described later) and the dynamic surface tension Y (described later) in a predetermined relationship (described later).

These leveling agents may be used alone or in combination of two or more.

<Thickener>

The water-dispersed pressure-sensitive adhesive composition preferably contains a thickener along with a leveling agent. When the water-dispersed pressure-sensitive adhesive composition contains a thickener, the viscosity X (described later) and the dynamic surface tension Y (described later) can be adjusted so as to satisfy a predetermined relationship (described later).

Examples of the thickener include polyacrylic acid-based thickeners (for example, polyacrylic acid), carboxylic acid-based copolymers, urethane-based thickeners, and polyvinyl alcohol-based thickeners, and preferably, from the viewpoint of satisfying the viscosity X (described later) and the dynamic surface tension Y (described later) in a predetermined relationship (described later), polyacrylic acid-based thickeners and carboxylic acid-based copolymers are used, more preferably, polyacrylic acid-based thickeners and carboxylic acid-based copolymers are used in combination. As the thickener, a commercially available product can be also used, and specifically, an example thereof includes "ARON B-500" (polyacrylic acid, manufactured by TOAGOSEI CO., LTD.).

From the viewpoint of satisfying the viscosity X (described later) and the dynamic surface tension Y (described later) in a predetermined relationship (described later), the thickener content is, for example, 1 part by mass or more, preferably 3 parts by mass or more, more preferably 4 parts by mass or more, and for example, below 8 parts by mass, preferably 6 parts by mass or less, more preferably 5 parts by mass or less with respect to 100 parts by mass of the water-dispersible polymer.

Further, the thickener content is, for example, 50 parts by mass or more, preferably 110 parts by mass or more, more preferably 200 parts by mass or more, further more preferably 300 parts by mass or more, and for example, 1500 parts by mass or less, preferably 1000 parts by mass or less, more preferably 700 parts by mass or less, further more preferably 500 parts by mass or less with respect to 100 parts by mass of the leveling agent.

These thickeners may be used alone or in combination of two or more.

<Another Component>

The water-dispersed pressure-sensitive adhesive composition may also contain another component. Examples of the other component include tackifiers, silane coupling agents, cross-linking agents, fillers, antioxidants, surfactants, and antistatic agents.

Examples of the tackifier include various tackifier resins such as rosin-based resins, rosin derivative resins, petroleum-based resins, terpene-based resins, phenol-based resins, and ketone-based resins, and preferably, a terpene-based resin is used.

The tackifier content is, for example, 5 parts by mass or more, and for example, 40 parts by mass or less with respect to 100 parts by mass of the water-dispersible polymer.

These other components may be used alone or in combination of two or more.

<Organic Solvent>

The water-dispersed pressure-sensitive adhesive composition does not contain an organic solvent. Therefore, it is possible to reduce an environmental load.

<Preparation of Water-Dispersed Pressure-Sensitive Adhesive Composition>

The water-dispersed pressure-sensitive adhesive composition can be prepared, for example, by adding each component (a leveling agent to be blended if necessary, a thickener to be blended if necessary, and another component to be blended if necessary) to an emulsion polymerization liquid of the water-dispersible polymer (the emulsion polymerization liquid contains a water-dispersible polymer and water). In addition, in the water-dispersed pressure-sensitive adhesive composition, the water content thereof is increased or decreased, thereby adjusting the solid content concentration.

The solid content concentration of the water-dispersed pressure-sensitive adhesive composition is, for example, 10% by mass or more, preferably 20% by mass or more, and for example, 60% by mass or less, preferably 40% by mass or less.

<Viscosity X and Dynamic Surface Tension Y>

In the water-dispersed pressure-sensitive adhesive composition, the viscosity X (Pa·s) and the dynamic surface tension Y (mN/m) at a life time of 100 milliseconds satisfy a predetermined relationship.

The viscosity X can be measured with a B-type viscometer at a measurement temperature of 25° C.

The dynamic surface tension Y is the surface tension in a non-equilibrium state. The surface tension of the solution goes towards equilibrium over time after the surface is formed. The dynamic surface tension Y is the surface tension at 100 milliseconds after the surface is formed, and is the surface tension in a non-equilibrium state. Therefore, it is distinguished from the static surface tension which is the surface tension in an equilibrium state generally measured 10 to 30 seconds after the surface is formed.

The dynamic surface tension Y can be measured by a maximum foam pressure method using a dynamic surface tensiometer.

Then, the viscosity X (Pa·s) and the dynamic surface tension Y (mN/m) satisfy the following formulas (1) and (2):

$$0.15 \leq X \leq 1.25 \tag{1}$$

$$Y \leq 19.3X + 35 \tag{2}$$

When the above-described formulas (1) and (2) are satisfied, it is possible to suppress the occurrence of repellence and streaks in coating onto a substrate subjected to silicone release treatment.

Specifically, there is a tendency that when the viscosity X is increased, the streaks occur, while the viscosity X is lowered, the repellence occurs.

In the water-dispersed pressure-sensitive adhesive composition, the viscosity X is lowered in order to suppress the occurrence of streaks. On the other hand, as described above, when the viscosity X is lowered, there is a tendency that the repellence occurs. However, in the water-dispersed pressure-sensitive adhesive composition, the dynamic surface tension Y is adjusted in a predetermined range in order to suppress the repellence. In other words, in the water-dispersed pressure-sensitive adhesive composition, it is possible to suppress the occurrence of both repellence and streaks by adjusting both the viscosity X and the dynamic surface tension Y in a predetermined relationship.

Also, since the lower the dynamic surface tension Y, the better the suppression of the repellence, the lower limit of the dynamic surface tension Y is not set.

Also preferably, the viscosity X and the dynamic surface tension Y further satisfy the following formula (3):

$$Y \leq -5.28X^2 + 17.3X + 36 \tag{3}$$

When the above-described formula (3) is satisfied, it is possible to further suppress the occurrence of repellence and streaks in coating onto the substrate subjected to the silicone release treatment.

Further, more preferably, the viscosity X and the dynamic surface tension Y further satisfy the following formula (4):

$$Y \geq 20 \tag{4}$$

When the above-described formula (4) is satisfied, it is possible to further suppress the occurrence of repellence and streaks in the coating onto a silicone treatment surface (the surface tension of the silicone treatment surface is about 20 mN/m).

Further, even more preferably, the viscosity X and the dynamic surface tension Y further satisfy the following formula (5):

$$X \leq 1.0 \tag{5}$$

When the above-described formula (5) is satisfied, even when a pressure-sensitive adhesive layer 2 (described later) obtained by coating of the water-dispersed pressure-sensitive adhesive composition is thin, it is possible to suppress the above-described occurrence of streaks.

Further, even more preferably, the viscosity X and the dynamic surface tension Y further satisfy the following formula (6):

$$0.4 \leq X \tag{6}$$

When the above-described formula (6) is satisfied, even when the pressure-sensitive adhesive layer 2 (described later) obtained by coating of the water-dispersed pressure-sensitive adhesive composition is thin, it is possible to suppress the above-described occurrence of repellence.

For example, the above-described leveling agent and the above-described thickener are blended into the water-dispersed pressure-sensitive adhesive composition so that the viscosity X and the dynamic surface tension Y satisfy the above-described formulas (1) to (6).

Since the water-dispersed pressure-sensitive adhesive composition reduces the environmental load, and can suppress the occurrence of repellence and streaks in coating onto the substrate subjected to the silicone release treatment, it is preferably used in production of the pressure-sensitive adhesive sheet.

<Pressure-Sensitive Adhesive Sheet>

One embodiment of a pressure-sensitive adhesive sheet is described with reference to FIG. 1.

A pressure-sensitive adhesive sheet 1 has a film shape (including a sheet shape) having a predetermined thickness. The pressure-sensitive adhesive sheet 1 extends in a plane direction perpendicular to a thickness direction. The pressure-sensitive adhesive sheet 1 has a flat upper surface and a flat lower surface.

The pressure-sensitive adhesive sheet 1 includes a first release film 3, the pressure-sensitive adhesive layer 2, and a second release film 4 in order toward one side in the thickness direction. Specifically, the pressure-sensitive adhesive sheet 1 includes a first release film 3, a pressure-sensitive adhesive layer 2 directly disposed on the upper surface (one surface in the thickness direction) of the first release film 3, and a second release film 4 directly disposed on the upper surface (one surface in the thickness direction) of the pressure-sensitive adhesive layer 2.

A thickness of the pressure-sensitive adhesive sheet 1 is, for example, 500 μm or less, preferably 400 μm or less, more preferably 300 μm or less, more preferably 200 μm or less, and for example, 10 μm or more, more preferably 30 μm or more, further more preferably 50 μm or more.

The first release film 3 is a film for covering and protecting the pressure-sensitive adhesive layer 2. The first release film 3 has a film shape. The first release film 3 is disposed on the entire lower surface of the pressure-sensitive adhesive layer 2 so as to be in contact with the lower surface of the pressure-sensitive adhesive layer 2.

The first release film 3 is a plastic substrate (plastic film), and examples thereof include polyester sheets (polyethylene terephthalate (PET) sheets), polyolefin sheets (for example, polyethylene sheets, polypropylene sheets), polyvinyl chloride sheets, polyimide sheets, and polyamide sheets (nylon sheets). The surface (one surface in the thickness direction) of the first release film 3 is subjected to the silicone release treatment. In other words, the first release film 3 is a substrate subjected to the silicone release treatment.

The thickness of the first release film 3 is, for example, 1 μm or more, and for example, 100 μm or less.

The pressure-sensitive adhesive layer 2 has a film shape. The pressure-sensitive adhesive layer 2 is disposed on the entire lower surface of the second release film 4 so as to be in contact with the lower surface of the second release film 4.

The pressure-sensitive adhesive layer 2 is formed from the above-described water-dispersed pressure-sensitive adhesive composition.

The thickness of the pressure-sensitive adhesive layer 2 is, for example, 5 μm or more, preferably 10 μm or more, more preferably 20 μm or more, and for example, 100 μm or less, preferably 80 μm or less, more preferably 60 μm or less.

The second release film 4 is a film for covering and protecting the pressure-sensitive adhesive layer 2. The second release film 4 has a film shape. The second release film 4 is disposed on the entire upper surface of the pressure-sensitive adhesive layer 2 so as to be in contact with the upper surface of the pressure-sensitive adhesive layer 2.

As the second release film 4, for example, the same film as the first release films 3 is used. The second release film 4 may be the same as or different from the first release film 3.

The thickness of the second release film 4 is, for example, 1 μm or more, and for example, 100 μm or less.

Then, in order to produce the pressure-sensitive adhesive sheet 1, first, a water-dispersed pressure-sensitive adhesive composition is coated onto one surface in the thickness direction of the first release film 3, thereby forming a coating film. As described above, since the water-dispersed pressure-sensitive adhesive composition can suppress the occurrence of repellence and streaks in coating onto the substrate subjected to the silicone release treatment, it can be coated onto the first release film 3 which is the substrate subjected to the silicone release treatment, while the occurrence of repellence and streaks is suppressed. Thereafter, the coating film is dried, thereby forming the pressure-sensitive adhesive layer 2. At this time, since the water-dispersed pressure-sensitive adhesive composition does not contain an organic solvent, it is possible to reduce the environmental load. Then, the second release film 4 is attached to one surface in the thickness direction of the pressure-sensitive adhesive layer 2. Thus, the pressure-sensitive adhesive sheet 1 is produced.

EXAMPLES

Next, the present invention is further described based on Examples and Comparative Examples below. The present invention is however not limited by these Examples and Comparative Examples. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

<Details of Each Component>

The details of each component are as follows.

AQUARON KH-1025: ammonium-α-sulfonato-ω-1-(allyloxymethyl)alkyloxypolyoxyethylene, manufactured by DKS Co., Ltd.

KBM-503: 3-methacryloxypropyltrimethoxysilane, manufactured by Shin-Etsu Chemical Co., Ltd.

ARON A-10H: polyacrylic acid, thickener, manufactured by TOAGOSEI CO., LTD.

ARON B-500: carboxylic acid-based copolymer, thickener, manufactured by TOAGOSEI CO., LTD.

PELEX OT-P: sodium dialkylsulfosuccinate (8 carbon atoms), leveling agent, manufactured by Kao Corporation NEOCOL P: sodium dialkylsulfosuccinate (8 carbon atoms), leveling agent, manufactured by DKS Co., Ltd.

PELEX TR: sodium dialkylsulfosuccinate (13 carbon atoms), leveling agent, manufactured by Kao Corporation TAMANOL E-200NT, terpene-based resin, tackifier <Production of Water-Dispersible Polymer>

Preparation Example 1

A reaction vessel equipped with a reflux condenser tube, a nitrogen introduction tube, a thermometer, and a stirrer was charged with 61.1 parts of ion-exchanged water and 0.07 parts of AQUARON KH-1025 as an emulsifier to be stirred at 60° C. for one hour or more, while a nitrogen gas was introduced thereto. Next, 0.1 parts of 2,2'-azobis{2-[N-(2-carboxyethyl)amidino]propane} n-hydrate as a polymerization initiator was put into a reaction vessel, and furthermore, a monomer emulsion was gradually added dropwise to the mixture over four hours to proceed an emulsion polymerization reaction, while the system was held at 60° C. As the monomer emulsion, a mixture obtained by adding 85 parts by mass of 2-ethylhexylacrylate, 13 parts by mass of methyl acrylate, 1.25 parts by mass of acrylic acid, 0.75 parts by mass of methacrylic acid, 0.025 parts of t-lauryl mercaptan (t-LSH, chain transfer agent), 0.02 parts of KBM-503, and 1.93 parts by mass of AQUARON KH1025 to 28 parts of ion-exchanged water to be emulsified was used. After completion of the dropwise addition of the monomer emulsion, the mixture was further held at 60° C. for three hours, the system was cooled to room temperature, then, a pH was adjusted to 7 by addition of 10% ammonium water, and 0.01 parts of NEOSINTOL 2208 (preservative) was added. Thus, a water-dispersible polymer (water-dispersible acrylic polymer) was obtained.

<Production of Water-Dispersed Pressure-Sensitive Adhesive Composition>

Example 1

With respect to 100 parts by mass of the water-dispersible polymer of Preparation Example 1, 265 parts by mass of ion-exchanged water, 3.15 parts by mass of ARON A-10H as a thickener, and 30 parts by mass of TAMANOL E-200NT as a tackifier were blended and mixed. Then, 2 parts by mass of PELEX OT-P as a leveling agent was blended, and a pH was adjusted to 9 by addition of 10% ammonium water. Thus, a water-dispersed pressure-sensitive adhesive composition (solid content concentration of 25% by mass) was produced.

Examples 2 to 9 and Comparative Examples 1 to 6

A water-dispersed pressure-sensitive adhesive composition was produced in the same manner as in Example 1. However, a mixing formulation was changed in accordance with Table 1.

<Evaluation>
[Viscosity X]

The viscosity (Pa·s) of each of the water-dispersible pressure-sensitive adhesives of Examples and Comparative Examples was measured using a B-type viscometer (manufactured by TOKIMEC INC.). A measurement temperature was set at 25° C., the number of rotations of No. 3 rotor was set at 20 rpm, and the measurement time was set at one minute. The results are shown in Table 1.

[Dynamic Surface Tension Y]

The dynamic surface tension (mN/m) of each of the water-dispersible pressure-sensitive adhesives of Examples and Comparative Examples was measured using a dynamic surface tensiometer BP-D5 (manufactured by Kyowa Interface Science Co., Ltd.) by a maximum foam pressure method (bubble pressure method). A measurement temperature was set at 25.0 (±1.0° C.), and the measurement humidity was set at 20% (±1.0%). As a glass probe, No. 010-274 was used, and the measurement was carried out at a maximum life time of 5000 milliseconds using the bubble pressure method (maximum foam pressure method) time-course measurement. The density value of 1.00 g/cm³ was used to calculate the surface tension, and the surface tension at a life time of 100 milliseconds was read. The results are shown in Table 1.

[Static Surface Tension]

The surface tension of each of the water-dispersible pressure-sensitive adhesives of Examples and Comparative Examples was measured using a surface tension measurement device (trade name: "Wilhelmey-type surface tensiometer", manufactured by Kyowa Interface Science Co., Ltd.) based on the du Nouy ring method (ring method) described in JIS-K3362: 2008. Specifically, first, about 60 mL of a water-dispersible pressure-sensitive adhesive as a sample liquid was put into a wide-mouthed cup (volume of 100 mL) for measurement (in 10 seconds after the surface was formed), and the obtained cup was placed on a stage provided in the device. Next, a platinum ring (ring diameter of 14.45 mm, ring wire diameter of 0.40 mm) after acetone cleansing was suspended above the sample liquid (the surface formed by the platinum ring was set parallel to the liquid surface of the sample liquid). Next, at a temperature of 25° C. (±1.0° C.), the platinum ring was increased relative to the sample liquid after being once immersed in the sample liquid. A peak value of the force (downward tensile force) acting on the ring was measured when the platinum ring was separated from the sample liquid surface, and the surface tension of the sample liquid (water-dispersible pressure-sensitive adhesive) was determined from the obtained measurement value. In the measurement, a stage rising rate was set at 0.200 mm/sec, a stage lowering rate was set at 0.200 mm/sec, a prewet stage rising rate was set at 0.700 mm/sec, and a prewet stage lowering rate was set at 0.700 mm/sec. A prewet immersion distance was set at 2.5 mm, and the prewet immersion time was set at 5 seconds.

[Evaluation of Coating Properties (Repellence and Streaks)]

The above-described water-dispersible pressure-sensitive adhesive was coated on one surface in the thickness direction of a PET release film (DIAFOIL MRF-38, manufactured by Mitsubishi Chemical Holdings Corporation) subjected to silicone treatment, thereby forming a pressure-sensitive adhesive layer having a thickness of 10 μm. The repellence and the streaks at this time were visually confirmed.

The repellence was evaluated based on the following criteria. The results are shown in Table 1.

Excellent: repellence was not observed.
Good: repellence was partially observed.
Bad: repellence was observed in the entire surface.

The streaks were evaluated based on the following criteria. The results are shown in Table 1.

Excellent: streaks were not observed.
Good: streaks were partially observed.
Bad: streaks were observed in the entire surface.

<Consideration>

Figure 2:
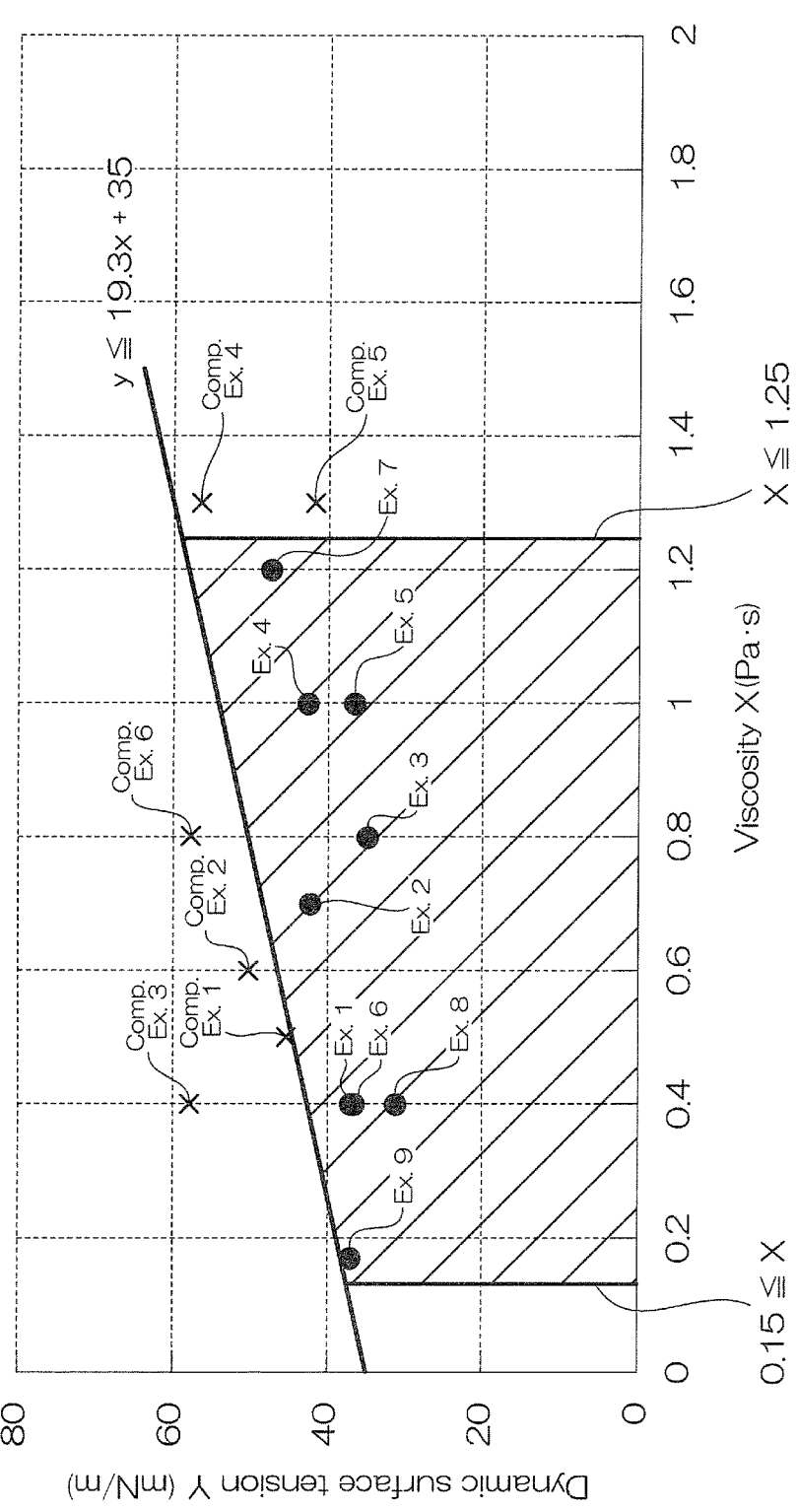
FIG. 2 shows a graph ($0.15 \leq X \leq 1.25$, and $Y \leq 19.3X+35$) illustrating a relationship between the viscosity X and the dynamic surface tension Y of Examples 1 to 9 and Comparative Examples 1 to 5.

A graph showing a relationship between the viscosity X and dynamic surface tension Y of Examples 1 to 9, and Comparative Examples 1 to 5 is shown in FIG. 2.

In the evaluation of coating properties, the repellence and the streaks were not observed, or partially observed in Examples 1 to 9. On the other hand, in the evaluation of coating properties, the repellence and the streaks were observed in the entire surface in Comparative Examples 1 to 5.

This shows that the relationship between the viscosity X and the dynamic surface tension Y (hatched portion in FIG. 2) which can suppress the occurrence of repellence and streaks is determined by $0.15 \leq X \leq 1.25$, and $Y \leq 19.3X+35$.

Figure 3:
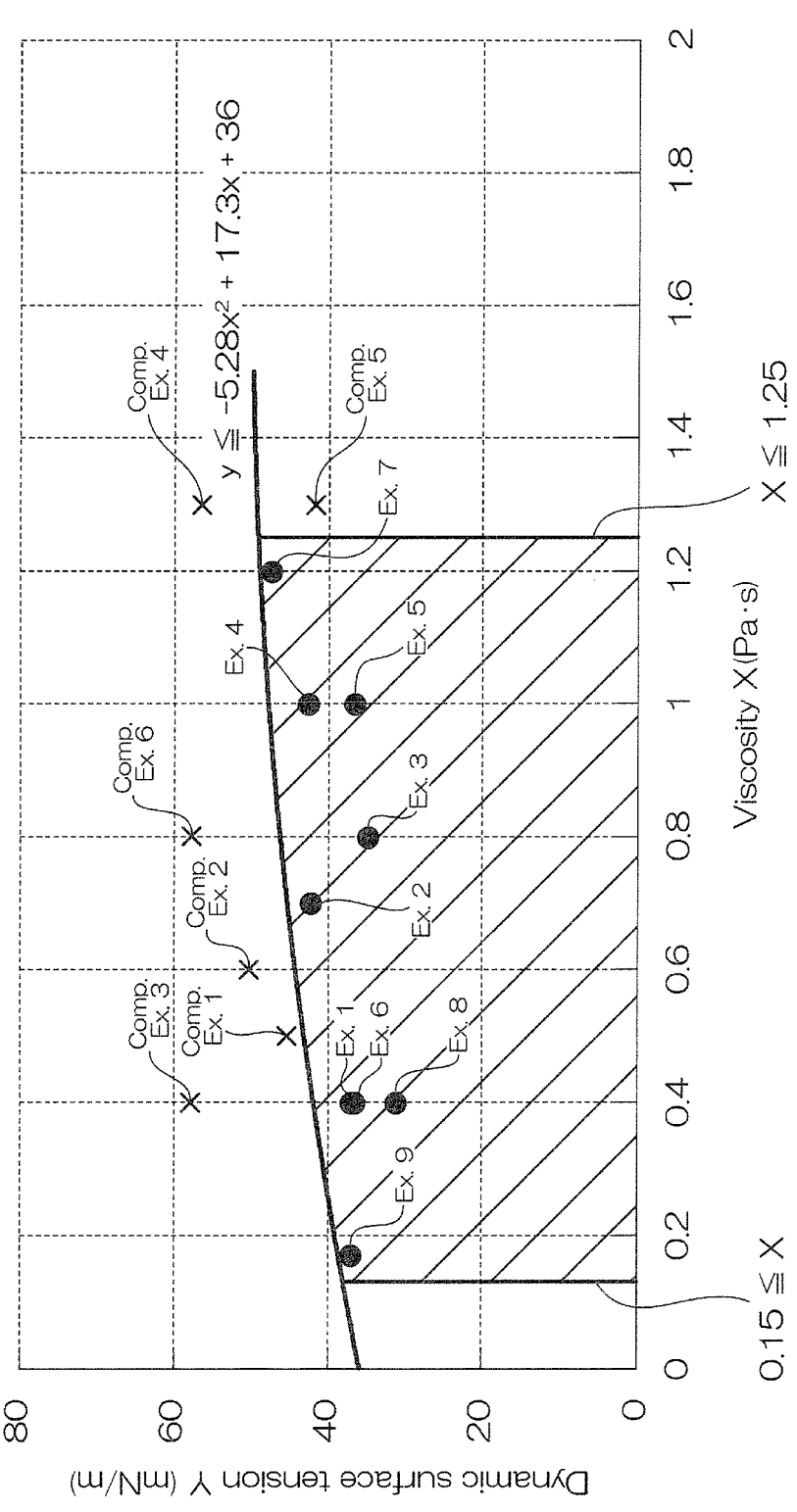
FIG. 3 shows a graph ($0.15 \leq X \leq 1.25$, and $Y \leq -5.28X^2+17.3X+36$) illustrating a relationship between the viscosity X and the dynamic surface tension Y of Examples 1 to 9 and Comparative Examples 1 to 5.

As shown in FIG. 3, it is also found that the relationship between the viscosity X and the dynamic surface tension Y (hatched portion in FIG. 3) which can suppress the occurrence of repellence and streaks is preferably determined by $0.15 \leq X \leq 1.25$, and $Y \leq -5.28X^2+17.3X+36$.

Figure 4:
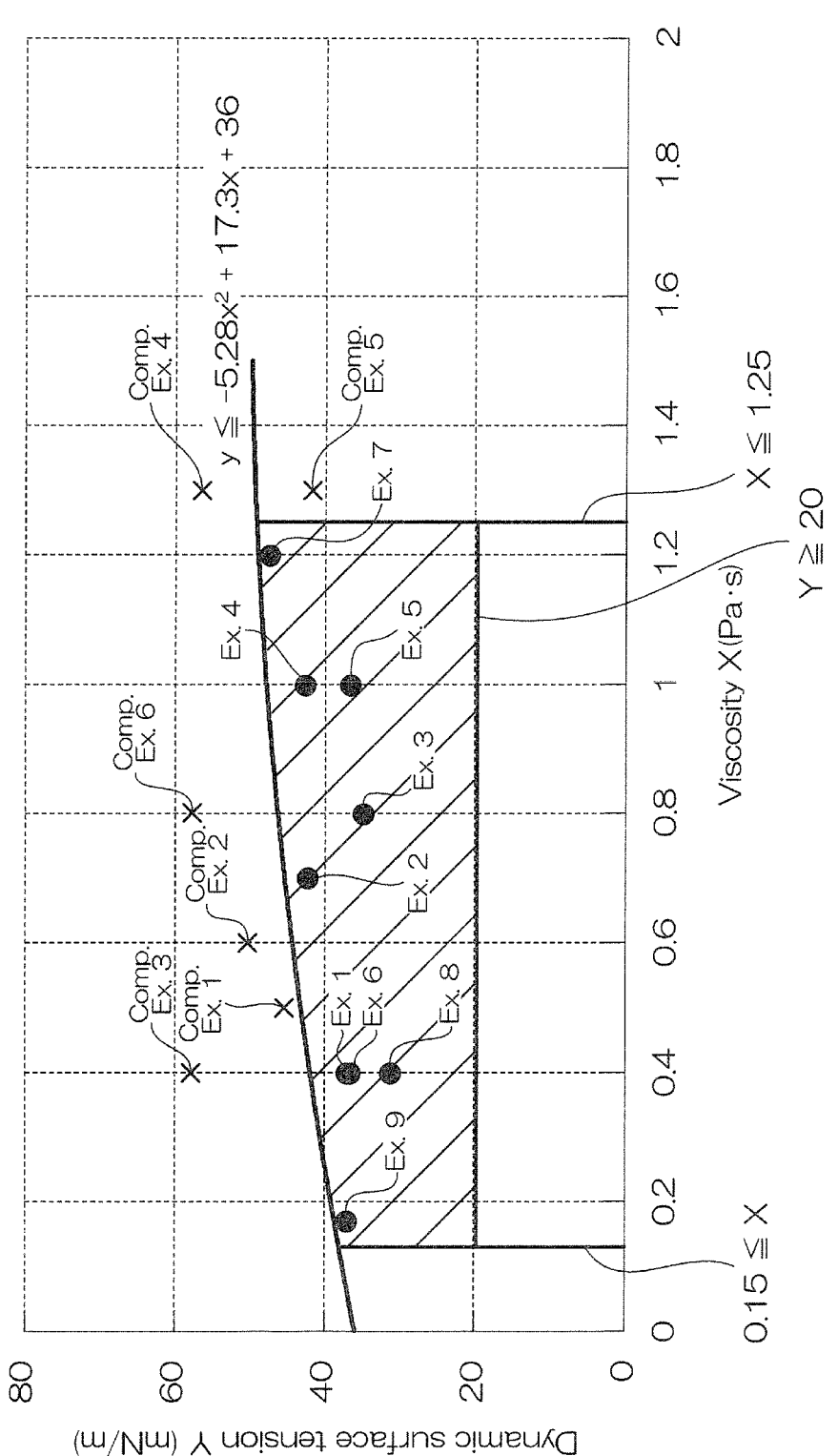
FIG. 4 shows a graph ($0.15 \leq X \leq 1.25$, $Y \leq -5.28X^2+17.3X+36$, and $Y \geq 20$) illustrating a relationship between the viscosity X and the dynamic surface tension Y of Examples 1 to 9 and Comparative Examples 1 to 5.

Further, since the surface tension of the PET release film subjected to the silicon treatment was about 20 mN/m, as shown in FIG. 4, in the coating onto the silicone treatment surface, the relationship between the viscosity X and the dynamic surface tension Y (hatched portion in FIG. 4) which can further suppress the occurrence of repellence and streaks is determined by $0.15 \leq X \leq 1.25$, $Y \leq -5.28X^2+17.3X+36$, and $Y \geq 20$.

15

Also, in the evaluation of coating properties, the streaks were partially observed in Example 7, while the streaks were not observed in Examples 1 to 6, 8, and 9.

Figure 5:
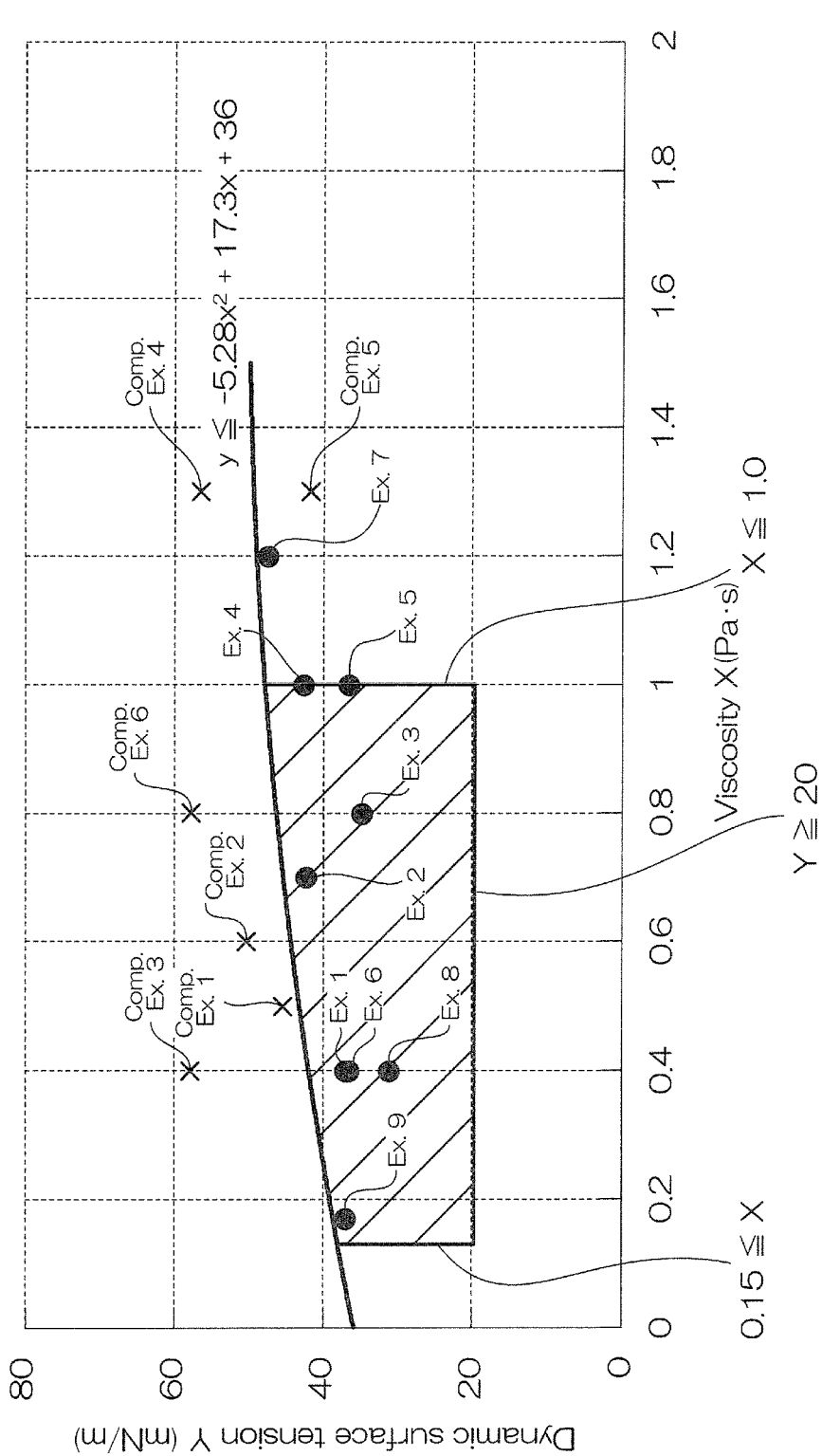
FIG. 5 shows a graph ($0.15 \leq X \leq 1.0$, $Y \leq -5.28X^2+17.3X+36$, and $Y \geq 20$) illustrating a relationship between the viscosity X and the dynamic surface tension Y of Examples 1 to 9 and Comparative Examples 1 to 5.

As shown in FIG. 5, this shows that the relationship between the viscosity X and the dynamic surface tension Y (hatched portion in FIG. 5) which can further suppress the occurrence of streaks is determined by $0.15 \leq X \leq 1.0$, $Y \leq -5.28X^2 + 17.3X + 36$, and $Y \geq 20$.

Also, in the evaluation of coating properties, the repellence was partially observed in Example 9, while the repellence was not observed in Examples 1 to 8.

Figure 6:
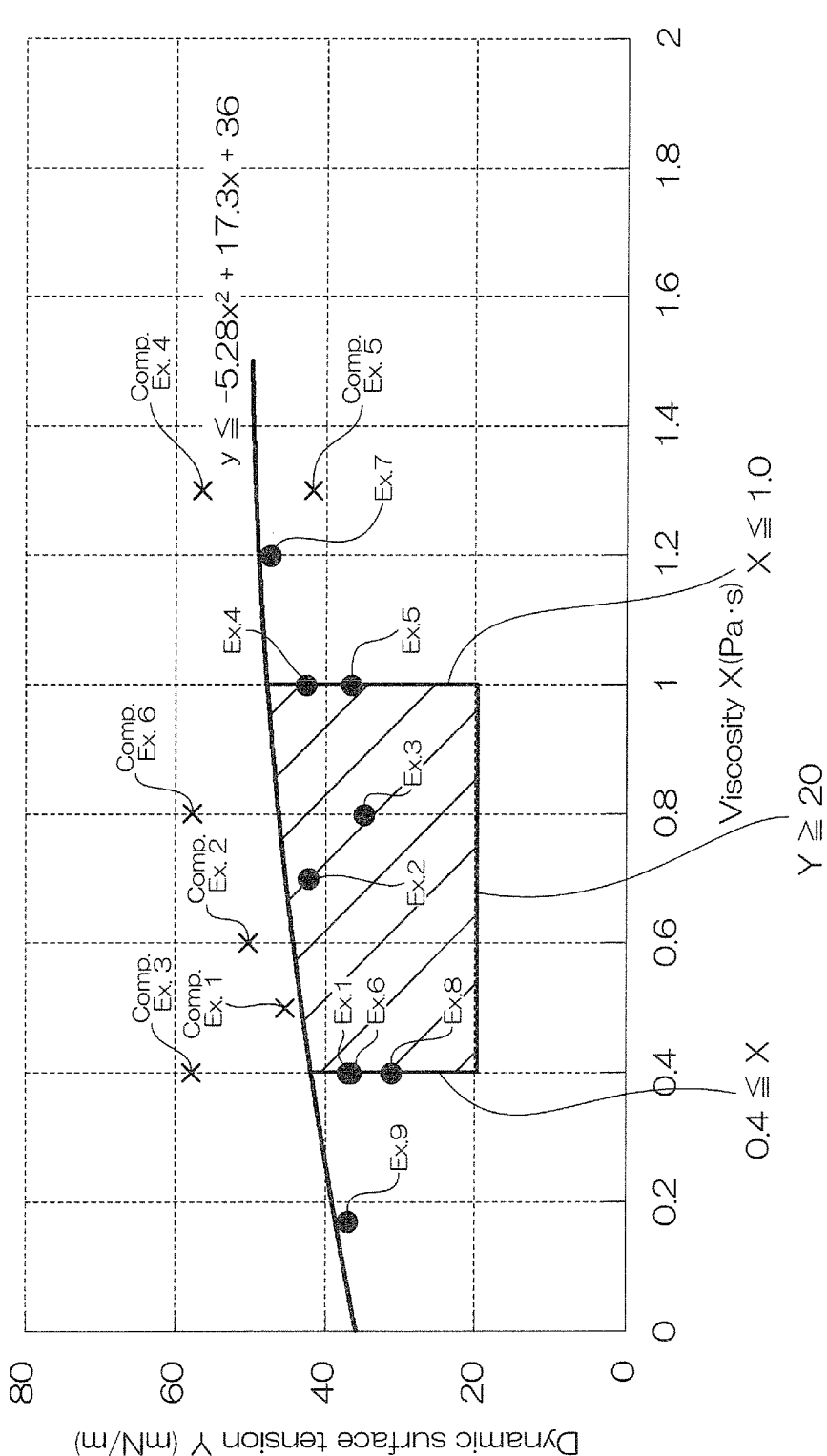
FIG. 6 shows a graph ($0.4 \leq X \leq 1.0$, $Y \leq -5.28X^2+17.3X+36$, and $Y \geq 20$) illustrating a relationship between the viscosity X and the dynamic surface tension Y of Examples 1 to 9 and Comparative Examples 1 to 5.

As shown in FIG. 6, this shows that the relationship between the viscosity X and the dynamic surface tension Y (hatched portion in FIG. 6) which can further suppress the occurrence of repellence as well as the occurrence of streaks is determined by $0.4 \leq X \leq 1.0$, $Y \leq -5.28X^2 + 17.3X + 36$, and $Y \geq 20$.

16 variation of the present invention that will be obvious to those skilled in the art is to be covered by the following claims.

INDUSTRIAL APPLICATION

The water-dispersed pressure-sensitive adhesive composition of the present invention is preferably used in production of a pressure-sensitive adhesive sheet.

The invention claimed is:

1. A water-dispersed pressure-sensitive adhesive composition comprising:

a water-dispersible polymer, a leveling agent, a thickener, and water, wherein the viscosity X (Pa·s) and the dynamic surface tension Y (mN/m) at a life time of 100 milliseconds satisfy the following formulas (1) and (2):

TABLE 1

| | | | Ex: Comparative Ex. No. | | | | | | | | |
| | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Water-Dispersed Pressure-Sensitive Adhesive Composition | Water-Dispersible Polymer (parts by mass) | | 100 | 100 | 100 | 100 | 100 | 100 | 100 | 100 | 100 |
| | Thickener (parts by mass) | ARON A-10H | 3.15 | 3.15 | 3.15 | 3.15 | 3.15 | 3.15 | 3.15 | 3.15 | 3.15 |
| | | ARON B500 | — | 1 | 1 | 2 | 2 | — | 2.5 | — | 4 |
| | Leveling Agent (parts by mass) | PELEX OT-P | 2 | 1 | 2 | 1 | 2 | — | 0.5 | 5 | 2 |
| | | NEOCOL P | — | — | — | — | — | 2 | — | — | — |
| | | PELEX TR | — | — | — | — | — | — | — | — | — |
| | Tackifier | TAMANOL E-200NT | 30 | 30 | 30 | 30 | 30 | 30 | 30 | 30 | 30 |
| | Solid Content Concentration (% by mass) | | 25 | 25 | 25 | 25 | 25 | 25 | 25 | 25 | 12.5 |
| Evaluation | Viscosity X (Ps · s) | | 0.4 | 0.7 | 0.8 | 1 | 1 | 0.4 | 1.2 | 0.4 | 0.17 |
| | Dynamic Surface Tension Y at Life Time of 100 milliseconds (mN/m) | | 36.9 | 42.2 | 34.7 | 42.5 | 36.4 | 36.4 | 47.3 | 31 | 36.9 |
| | Static Surface Tension (mN/m) | | 31 | 34 | 34 | 31 | 29 | 30.0 | 34.5 | 33.8 | 31 |
| | Repellence | | Excellent | Excellent | Excellent | Excellent | Excellent | Excellent | Excellent | Excellent | Good |
| | Streaks | | Excellent | Excellent | Excellent | Excellent | Excellent | Excellent | Good | Excellent | Excellent |

| | | | Ex: Comparative Ex. No. | | | | | |
| | | | Comparative Ex. 1 | Comparative Ex. 2 | Comparative Ex. 3 | Comparative Ex. 4 | Comparative Ex. 5 | Comparative Ex. 6 |
|---|---|---|---|---|---|---|---|---|
| Water-Dispersed Pressure-Sensitive Adhesive Composition | Water-Dispersible Polymer (parts by mass) | | 100 | 100 | 100 | 100 | 100 | 100 |
| | Thickener (parts by mass) | ARON A-10H | 3.15 | 3.15 | 3.15 | 3.15 | 3.15 | 3.15 |
| | | ARON B500 | — | 1 | — | 3 | 3 | 2 |
| | Leveling Agent (parts by mass) | PELEX OT-P | 1 | 0.5 | — | 0.3 | 1 | — |
| | | NEOCOL P | — | — | — | — | — | — |
| | | PELEX TR | — | — | 2 | — | — | — |
| | Tackifier | TAMANOL E-200NT | 30 | 30 | 30 | 30 | 30 | 30 |
| | Solid Content Concentration (% by mass) | | 25 | 25 | 25 | 25 | 25 | 25 |
| Evaluation | Viscosity X (Ps · s) | | 0.5 | 0.6 | 0.4 | 1.3 | 1.3 | 0.8 |
| | Dynamic Surface Tension Y at Life Time of 100 milliseconds (mN/m) | | 45.4 | 50.4 | 57.9 | 56.5 | 41.8 | 57.8 |
| | Static Surface Tension (mN/m) | | 31 | 36.5 | 31 | 37 | 34 | 47.1 |
| | Repellence | | Bad | Bad | Bad | Bad | Excellent | Bad |
| | Streaks | | Excellent | Excellent | Excellent | Bad | Bad | Excellent |

While the illustrative embodiments of the present invention are provided in the above description, such is for illustrative purpose only and it is not to be construed as limiting the scope of the present invention. Modification and $$0.15 \leq X \leq 1.25 \tag{1}$$

$$Y \leq 19.3X + 35 \tag{2}, \text{ and}$$

wherein a solid content concentration of the water-dispersed pressure-sensitive adhesive composition is 10% by mass or more and 40% by mass or less, and a content of the thickener is 3 parts by mass or more with respect to 100 parts by mass of the water-dispersible polymer.

2. The water-dispersed pressure-sensitive adhesive composition according to claim 1 further satisfying the following formula (3):

$$Y \le -5.28X^2 + 17.3X + 36 \tag{3}$$

3. The water-dispersed pressure-sensitive adhesive composition according to claim 2 further satisfying the following formula (4):

$$Y \ge 20 \tag{4}$$

4. The water-dispersed pressure-sensitive adhesive composition according to claim 3 further satisfying the following formula (5):

$$X \le 1.0 \tag{5}$$

5. The water-dispersed pressure-sensitive adhesive composition according to claim 4 further satisfying the following formula (6):

$$0.4 \le X \tag{6}$$

6. The water-dispersed pressure-sensitive adhesive composition according to claim 1, wherein the water-dispersible polymer is a water-dispersible acrylic polymer, and the water-dispersible acrylic polymer is a polymer of a monomer component containing 70% by mass or more and 99.5% by mass or less of alkyl (meth)acrylate, 0.1% by mass or more and 10% by mass or less of a carboxy group-containing monomer, and 0% by mass or more and 29.9% by mass or less of a functional group-containing vinyl monomer.

7. The water-dispersed pressure-sensitive adhesive composition according to claim 6, wherein the carboxy group-containing monomer is acrylic acid and/or methacrylic acid.

8. The water-dispersed pressure-sensitive adhesive composition according to claim 1, wherein the leveling agent includes sodium dialkylsulfosuccinate.

9. The water-dispersed pressure-sensitive adhesive composition according to claim 8, wherein the sodium dialkylsulfosuccinate has 6 or more and 12 or less carbon atoms.

10. The water-dispersed pressure-sensitive adhesive composition according to claim 1, wherein the leveling agent content is 0.5 parts by mass or more and below 5 parts by mass with respect to 100 parts by mass of the water-dispersible polymer.

11. The water-dispersed pressure-sensitive adhesive composition according to claim 1, wherein the thickener includes polyacrylic acid or a carboxylic acid-based copolymer.

12. The water-dispersed pressure-sensitive adhesive composition according to claim 1, wherein the thickener content is 3 parts by mass or more and below 8 parts by mass with respect to 100 parts by mass of the water-dispersible polymer.

* * * * *